(12) United States Patent
Kopp

(10) Patent No.: US 11,953,085 B2
(45) Date of Patent: Apr. 9, 2024

(54) METHOD FOR OPERATING A POWERTRAIN OF A MOTOR VEHICLE, IN PARTICULAR A TRUCK, AND MOTOR VEHICLE

(71) Applicant: AUDI AG, Ingolstadt (DE)

(72) Inventor: Andreas Kopp, Kösching (DE)

(73) Assignee: AUDI AG, Ingolstadt (DE)

(*) Notice: Subject to any disclaimer, the term of this patent is extended or adjusted under 35 U.S.C. 154(b) by 728 days.

(21) Appl. No.: 17/056,115

(22) PCT Filed: Jun. 18, 2019

(86) PCT No.: PCT/EP2019/065930
§ 371 (c)(1),
(2) Date: Nov. 17, 2020

(87) PCT Pub. No.: WO2020/025217
PCT Pub. Date: Feb. 6, 2020

(65) Prior Publication Data
US 2021/0190198 A1     Jun. 24, 2021

(30) Foreign Application Priority Data

Aug. 3, 2018   (DE) .................... 10 2018 213 067.1

(51) Int. Cl.
*F16H 57/04* (2010.01)
*F16H 57/02* (2012.01)

(52) U.S. Cl.
CPC ..... *F16H 57/0413* (2013.01); *F16H 57/0401* (2013.01); *F16H 57/0415* (2013.01); *F16H 57/0475* (2013.01); *F16H 57/0476* (2013.01); *F16H 2057/02043* (2013.01)

(58) Field of Classification Search
CPC ........... F16H 57/0412; F16H 2059/743; F16H 2059/366; F16H 59/78; F16H 59/44
See application file for complete search history.

(56) References Cited

FOREIGN PATENT DOCUMENTS

| DE | 196 37 817 A1 | 3/1998 |
|---|---|---|
| DE | 199 53 511 A1 | 5/2001 |
| DE | 10 2011 012 241 A1 | 10/2011 |
| DE | 10 2012 019 609 A1 | 4/2014 |
| DE | 10 2013 009 275 A1 | 12/2014 |
| DE | 10 2015 014 841 B3 | 1/2017 |
| DE | 10 2017 101 212 A1 | 7/2017 |

(Continued)

OTHER PUBLICATIONS

German Examination Report dated Nov. 17, 2020, in connection with corresponding DE Application No. 10 2018 213 067.1 (9 pp., including machine-generated English translation).

(Continued)

*Primary Examiner* — Ana M Vazquez
(74) *Attorney, Agent, or Firm* — Maier & Maier, PLLC

(57) ABSTRACT

A method for operating a powertrain, having at least one drive motor and at least one gearbox, of a motor vehicle which can be driven by the drive motor, via the gearbox, in which heat is transferred from the drive motor to the gearbox in a targeted manner, as a result of which the gearbox is heated in a targeted manner. The heat is transferred from the drive motor to the gearbox in a targeted manner on the basis of predictive data which include at least one future state of the motor vehicle.

15 Claims, 1 Drawing Sheet

(56) References Cited

FOREIGN PATENT DOCUMENTS

| DE | 10 2017 101 454 A1 | | 8/2017 | |
|---|---|---|---|---|
| EP | 0 736 701 A1 | | 10/1996 | |
| EP | 736703 A1 | * | 10/1996 | ............ F01M 5/007 |
| EP | 0736703 A1 | | 10/1996 | |
| EP | 0 787 929 A2 | | 8/1997 | |
| WO | 2007/006663 A1 | | 1/2007 | |

OTHER PUBLICATIONS

Examination Report dated May 31, 2019 in corresponding German application No. 10 2018 213 067.1; 20 pages including Machine-generated English-language translation.
International Search Report dated Oct. 21, 2019 in corresponding International application No. PCT/EP2019/065930; 6 pages.
Written Opinion of the International Searching Authority dated Oct. 21, 2019 in corresponding International application No. PCT/EP2019/065930; 11 pages including Machine-generated English-language translation.
English-language translation of International Preliminary Report on Patentability dated Feb. 18, 2021, in corresponding International Application No. PCT/EP2019/065930; 9 pages.
Office Action dated May 4, 2023, in corresponding Chinese Application No. 201980039752.X, 25 pages.

* cited by examiner

METHOD FOR OPERATING A POWERTRAIN OF A MOTOR VEHICLE, IN PARTICULAR A TRUCK, AND MOTOR VEHICLE

FIELD

The disclosure relates to a method for operating a powertrain of a motor vehicle, particularly a truck. The invention further relates to a motor vehicle, particularly a truck.

BACKGROUND

DE 10 2015 014 841 B3 discloses a method for operating a drive device of a motor vehicle, wherein the drive device has at least one heat-generating drive unit, and an actual temperature of the drive device is set to a target temperature when the drive unit is running. Furthermore, at least one parking location of the motor vehicle is determined.

DE 196 37 817 A1 discloses a device for cooling and preheating gearbox oil in internal combustion engines for vehicles. The device has a compensation tank, at least one water cooler, which can be activated in the cooling circuit when a predetermined temperature is reached, and a water/oil heat exchanger.

DE 10 2017 101 212 A1 discloses a method for preconditioning various subsystems of an electric vehicle. In the method, preconditioning of a battery pack, a passenger compartment, a gearbox, and a motor of the electric vehicle is planned before a next expected utilization period, on the basis of at least one weather forecast.

SUMMARY

In addition, DE 10 2017 101 454 A1 discloses an electrified vehicle, which comprises a gearbox and an electrically operated heating device. The heating device is configured to heat, in a targeted manner, a gearbox fluid, which is recirculated in the gearbox.

The object of the present invention is to obtain a method and a motor vehicle such that an especially efficient operation of the motor vehicle can be realized.

A first aspect of the invention relates to a method for operating a powertrain of a motor vehicle, particularly a truck, such as, for example, a passenger car. The powertrain has at least one drive motor and at least one gearbox, wherein the motor vehicle can be driven by the drive motor, via the gearbox. This means that the gearbox can be driven by the drive motor. In particular, it should also be understood that the drive motor can provide at least one torque, which can be or is applied to the gearbox, particularly via an output shaft of the drive motor, said output shaft being formed, for example, as a crankshaft. The gearbox forms a further torque, for example, from the torque applied to the gearbox, wherein the torques can differ from one another, for example, with respect to their amount and/or with respect to their working direction. The gearbox can provide the further torque, by means of which the motor vehicle, particularly at least one or more wheels of the motor vehicle, can be driven.

In the method, heat from the drive motor is transferred, in a targeted manner, to the gearbox, whereby the gearbox is heated in a targeted manner.

In order to then be able to implement an especially efficient and thus low-energy-consuming, particularly low-fuel-consuming, operation of the powertrain and thus of the motor vehicle, it is provided according to the invention that the heat can be transferred from the drive motor to the gearbox, in a targeted manner, on the basis of predictive data. The predictive data characterize at least one future state of the motor vehicle. The feature that the heat is transferred from the drive motor to the gearbox in a targeted manner, whereby the gearbox is heated in a targeted manner, should be understood to mean that the powertrain is operated in a targeted manner or as desired, for example by means of an electronic computing device of the powertrain and/or of the motor vehicle, particularly controlled and/or regulated such that there is heating of the gearbox, particularly that there is an at least very brief period of heating of the drive motor and a resulting cooling of the resulting heating of the gearbox drive motor, following the heating of the drive motor. Within the scope of the method according to the invention, the heating of the gearbox, which is implemented in a targeted manner and thus desired, is thus not or not only based on arbitrary and/or incidental heat transfers, but instead is based at least partially, particularly at least predominantly or completely, on targeted processes or processes implemented in a targeted manner, particularly control and/or regulating processes, within the scope of which the powertrain is operated in a targeted manner, particularly by means of the electronic computing device, in order to achieve heating of the gearbox. To this end, the electronic computing device provides actuation signals, particularly electric actuation signals, by means of which at least one or more components of the powertrain are actuated in a targeted manner and thereby operated in a targeted manner in order to thereby effect the targeted heating of the gearbox. One of the components is, for example, the drive motor. Another one of the components may be, for example, the gearbox.

The predictive data, and the fact that the predictive data characterize at least one future state, as well as the future state should be understood to mean that, for example, the method is implemented at a first point in time or during a first time span. In other words, the heat, for example, is transferred from the drive motor to the gearbox at the first point in time or during the first time span in order to heat the gearbox in a targeted manner at the first point in time or during the first time span. However, the motor vehicle and/or the powertrain is not yet in the future state at the first point in time or during the first time span, but instead the motor vehicle has the future state only upon the second point in time chronologically following the first point in time or during a second time span chronologically following the first time span, with a probability. In other words, the future state is a future state based on the heating of the gearbox. For example, it is determined, particularly by means of the electronic computing device, at a further point in time or during a further time span, that the motor vehicle will have the future state at the second point in time or during the second time span, particularly with a certain probability, wherein the second point in time or the second time span chronologically follows the further point in time or the further time span. In this case, the further point in time may correspond to the first point in time and/or the further time span may correspond to the first time span or, however, the first point in time follows the further point in time and/or the further time span follows the first time span.

Preferably, the method according to the invention is implemented during a trip and/or while the drive motor is activated and/or while the motor vehicle is being driven by the drive motor and/or while the gearbox is being driven by the drive motor. The feature that the drive motor is activated particularly means that, particularly when the drive motor is formed on a combustion engine, combustion processes take place in the drive motor and/or that the drive motor provides torques, particularly via its output shaft.

The drive motor may be formed as an electric machine or as a combustion engine, particularly as a reciprocating piston combustion engine.

By means of the method according to the invention, it is possible that the gearbox has an especially advantageous, particularly an especially high, temperature, for example, at a stopping point in time, at which the drive motor or the motor vehicle as a whole is stopped and, for example, parked. If there is a starting point in time following the stopping point in time, at which the motor vehicle and/or the drive motor is restarted, the motor vehicle and/or the powertrain thus have an especially advantageous, particularly an especially high, temperature at the starting point in time such that the inner friction of the powertrain can be kept especially low at the starting point in time and during operation following the starting point in time. As a result, an especially low-energy-consuming operation can be ensured. To this end, exhaust heat, which is already available and provided by the drive motor during a time period preceding the stopping point in time, is used as the heat which is transferred from the drive motor to the gearbox in a targeted manner. In other words, within the scope of the method according to the invention, exhaust heat can be used, which is normally lost without being used, in order to provide especially advantageous conditions, which are favorable for efficient operation, at the starting point in time.

Due to the consideration of the predictive data, the targeted heating of the gearbox can be implemented and/or at least prepared when the motor vehicle does not yet actually have the future state which is especially advantageous, for example, for the targeted heating of the gearbox. If the motor vehicle actually reaches the future state, the gearbox can then be heated especially efficiently.

Within the scope of the method according to the invention, the gearbox formed, for example, as a variable speed gearbox, as a manual gearbox, as an automatic gearbox, as a dual clutch transmission, as an automatic transmission having a hydrodynamic torque converter and characterizing a torque converter, and/or as a starter gearbox, can be used as a heat accumulator, in order to store heat, which is normally lost without being used, for example, during a time interval between the stopping point in time and the starting point in time, while an activation of the motor vehicle and/or of the drive motor is suppressed. This stored heat can then be used or this means that the powertrain has an advantageous temperature at the starting point in time.

In particular, it is provided within the scope of the method according to the invention that the gearbox is heated, at least partially in parallel or simultaneously with the drive motor, taking the predictive data into account such that, for example, a first temperature, which is characterized as a motor or unit temperature, is raised at least partially simultaneously or in parallel with a second temperature of the gearbox, which is characterized as well as a gearbox temperature. The drive motor is also characterized as a unit. The invention also takes advantage of the fact that the gearbox and the unit are coupled together thermally, via at least one circuit, through which a medium, which is formed as a fluid, can flow and which is formed, for example, as a cooling circuit, as well as mechanically coupled together. Heat can be transferred, in a targeted manner, from the drive motor to the gearbox, particularly via the thermal coupling, in order to thereby heat the gearbox in a targeted manner. For example, if the gearbox temperature is at a higher level than the unit temperature at the stopping point in time, no heat or only a small quantity of heat is transferred from the drive motor to the gearbox after the stopping point in time. As a result, an especially high amount of residual heat can be realized such that the gearbox has an especially high temperature at the starting point in time and thus at a point in time of a restart of the motor vehicle. The inner friction and thus losses can thereby be kept at an especially low level. In order to keep the energy consumption especially low in this case, at least one part, particularly at least one predominant part, of the heat or all the heat, which is transferred from the drive motor to the gearbox in order to thereby heat the gearbox in a targeted manner, is heat already provided by the drive motor, particularly exhaust heat which is usually lost without being used. According to the invention, the exhaust heat is used to heat the gearbox.

In an especially advantageous embodiment of the invention, the heat is transferred from the drive motor to the gearbox in a targeted manner also as a function of at least one efficiency value, which is particularly stored in a storage device of the electronic computing device, wherein the efficiency value characterizes a level of efficiency and/or a power loss of the gearbox. The gearbox can hereby be heated in an especially efficient manner.

In a further embodiment of the invention, the heat is transferred from the drive motor to the gearbox in a targeted manner also as a function of at least one limit value, which is particularly stored in the storage device of the electronic computing device, wherein the limit value characterizes a maximum permissible temperature of the gearbox. Excessively high temperatures of the gearbox can hereby be avoided, and an especially high amount of heat can be transferred from the gearbox to the drive motor. As a result, an especially efficient operation can be ensured.

A further embodiment is characterized in that the predictive data characterize at least one future driving speed of the motor vehicle and/or at least one future load of the drive motor and/or at least one future rotational speed of the drive motor and/or at least one future temperature of the drive motor and/or at least one future temperature of the gearbox and/or a course of a driving route ahead of the motor vehicle and, for example, to be driven by the motor vehicle in the future and/or a future speed limit which applies to the motor vehicle and/or a future switch-off point of the drive motor and/or a destination, which the motor vehicle will reach in the future, and/or a temporary switch-off phase of the drive motor. The future state can thereby be calculated very precisely with a high probability to the extent that the gearbox can be heated especially advantageously.

In a further embodiment of the invention, at least one part of the predictive data is determined by means of data which the motor vehicle receives wirelessly, particularly via the Internet, from at least one electronic computing device, which is external to the motor vehicle and also characterized as a server or backend. The future state can thereby be determined very precisely to the extent that the gearbox can be heated especially advantageously.

Alternatively or additionally, at least one part of the predictive data is determined by means of data which are stored in the storage device of the electronic computing device of the motor vehicle. The data stored in the storage device are, for example, learning data which have been determined based on driving situations and/or driving states and/or utilizations of the motor vehicle from the past and thus characterize, for example, a utilization history of the motor vehicle. By means of the learning data, at least one driving situation which already occurred in the past and is now reoccurring can be detected such that the future state can be inferred in an especially precise manner.

In order to heat the gearbox in an especially advantageous manner, it is provided in a further embodiment of the invention that the targeted transfer of heat from the drive motor to the gearbox means that the heat from the drive motor is transferred to at least one first medium for cooling the drive motor, transferred from the first medium, via at least one heat exchanger, to at least one second medium, and transferred from the second medium to the gearbox, in a particularly targeted manner. The respective medium is preferably formed as a fluid, particularly a liquid. For example, the respective medium flows through a respective circuit, wherein the circuits are thermally coupled to one another via the at least one heat exchanger and thus in a heat-transferring manner.

In this case, it has been shown to be especially advantageous when the targeted transfer of heat from the drive motor to the gearbox means that a temperature of the first medium is increased in a targeted manner. An operating state of the drive motor can hereby be set, in a targeted manner, for example, particularly by means of the electronic computing device, whereby this results in an increase of temperature of the first medium. This takes place, for example, by means of actuating, particularly controlling and/or regulating, the drive motor by means of the computing device. The first medium can thereby be heated especially effectively and efficiently.

A further embodiment is characterized in that the targeted transfer of heat from the drive motor to the gearbox means that at least one flow of the first medium and/or the second medium through the heat exchanger is adjusted in a targeted manner. The gearbox can thereby be heated in an especially targeted manner and thus effectively and efficiently. For example, the flow of the first medium and/or the flow of the second medium is adjusted by means of a valve device. The flow in this case is, for example, a mass and/or volumetric flow.

A second aspect of the invention relates to a motor vehicle which is formed for implementing the method according to the invention. The motor vehicle has an electronic computing device, at least one drive motor, and at least one gearbox. The motor vehicle can be driven by the drive motor, via the gearbox. In this case, the motor vehicle comprises a powertrain, which comprises the drive motor, the gearbox, and the electronic computing device. The computing device in this case is formed to effect a targeted transfer of heat from the drive motor to the gearbox and thereby targeted heating of the gearbox.

In order to then realize an especially efficient and thus low-loss and/or efficiency-favorable operation of the powertrain and thus of the motor vehicle as a whole, it is provided according to the invention that the computing device is formed to transfer heat from the drive motor to the gearbox in a targeted manner, as a function of predictive data which characterize at least one future state of the motor vehicle, and/or the computing device is formed to effect the targeted transfer of heat from the drive motor to the gearbox as a function of predictive data. In this case, the computing device receives and/or ascertains, for example, the predictive data, particularly from data which are stored in a storage device of the electronic computing device and/or from data which the electronic computing device receives via the Internet and/or wirelessly from at least one electronic computing device which is external as relates to the motor vehicle. Advantages and advantageous embodiments of the first aspect of the invention should be considered advantages and advantageous embodiments of the second aspect of the invention and vice versa.

The invention also comprises the combinations of the features of the described embodiments.

The invention also includes refinements of the motor vehicle according to the invention, which have features as they have already been described in association with the refinements of the method according to the invention. For this reason, the corresponding refinements of the motor vehicle according to the invention are not described again here.

BRIEF DESCRIPTION OF THE FIGURES

An exemplary embodiment of the invention is described in the following. The following is shown.

DETAILED DESCRIPTION

Figure 1:
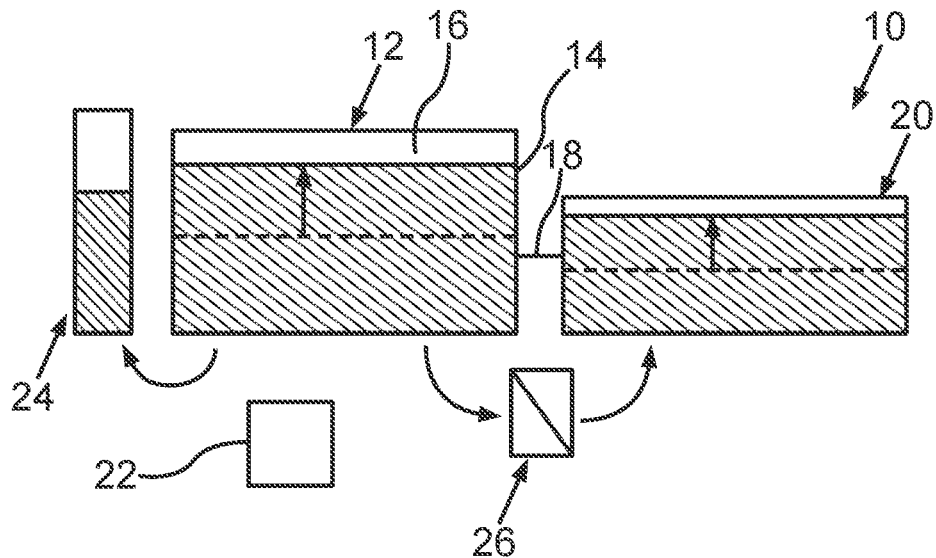
FIG. 1 a schematic representation of a powertrain of a motor vehicle according to the invention, wherein the powertrain is formed for implementing a method according to the invention.

The exemplary embodiment explained in the following refers to a preferred embodiment of the invention. With the exemplary embodiment, the described components of the embodiment represent individual features to be considered independently of one another, which also further embody the invention independently of one another. Thus, the disclosure should also comprise combinations of the features of the embodiment other than those shown. Furthermore, the described embodiment can also be supplemented through further described features of the invention.

The same reference numerals refer to equivalent features and functions in the figures.

FIG. 1 shows, in a schematic representation, a powertrain 10 of a motor vehicle, particularly of a truck such as, for example, a passenger car. A method for operating the powertrain 10 is described in the following by means of FIGS. 1 and 2. The powertrain 10 has at least one drive motor 12, which is formed, for example, as a combustion engine. The drive motor 12 comprises, for example, a first housing element 14 and a second housing element 16, wherein the housing elements 14 and 16 can be formed separately from one another and may be connected to one another. Housing element 14, for example, is a crank housing, particularly a cylinder crank housing, wherein housing element 16, for example, is a cylinder head. Housing element 14 forms, for example, at least one or more combustion chambers, which may be formed as cylinders. During fueled operation of the combustion engine, combustion processes are occurring in the respective combustion chamber. The aforementioned method in this case is implemented during a trip of the motor vehicle and/or during fueled operation.

The drive motor 12, particularly housing element 14 and/or housing element 16, is arranged in a first circuit, through which a first medium can flow. The first circuit, for example, is a cooling circuit, wherein the first medium, for example, is a cooling medium. The first medium is preferably a fluid, particularly a liquid. In particular, the liquid may be formed as water or at least contains water, such that the cooling medium, for example, can be cooling water. By means of the first medium, at least one part of the combustion engine and/or of the drive motor 12 can be cooled in that, for example, there is a transfer of heat from the drive motor 12 to the first medium. The drive motor 12 is hereby cooled, and the first medium is heated. FIG. 1 in this case has arrows indicating a respective transfer of heat and/or a respective transmission of heat. In particular, it is conceivable that heat from housing element 14 passes to housing element 16.

The drive motor 12 has an output shaft 18 formed, for example, as a crankshaft, by means of which the drive motor 12 can provide at least one torque, particularly for driving the motor vehicle, and/or it provides the torque during the method.

Moreover, the powertrain 10 comprises at least one gearbox 20, which can be coupled or is coupled with the drive motor 12, particularly with the output shaft 18. The torque provided by the drive motor 12 can thereby be applied to the gearbox 20, whereby the gearbox 20 can be driven or is driven. In this case, the motor vehicle can be driven by the drive motor 12, via the gearbox 20, and/or the motor vehicle is driven by the drive motor 12, via the gearbox 20, for example, during the method.

As explained in more detail in the following, heat is transferred from the drive motor 12 to the gearbox 20 in a targeted manner with the method, whereby the gearbox is heated in a targeted manner.

The gearbox 20 is arranged, for example, in a second circuit, through which a second medium can flow. The second medium, for example, is a liquid. In particular, the second medium may be oil, which is also characterized as gearbox oil. In this case, a heat exchange can take place between the gearbox 20 and the second medium. In a first operating state, such a heat exchange takes place, for example, between the gearbox 20 and the second medium, such that heat passes from the gearbox 20 to the second medium. The gearbox 20 is hereby cooled, and the second medium is heated. In a second operating state, such a heat exchange can take place, for example, between the gearbox 20 and the second medium, such that heat passes from the second medium to the gearbox 20. The gearbox 20 is hereby heated, and the second medium is cooled.

The powertrain 10 also comprises at least one electronic computing device 22, which is especially schematically shown in FIG. 1, and which also is designated as a control unit. In this case, the method is implemented by means of the electronic computing device 22.

In order to then be able to implement an especially efficient and thus low-energy-consuming operation of the powertrain 10 and thus of the motor vehicle as a whole, heat is transferred from the drive motor 12 to the gearbox 20, particularly via the media, on the basis of predictive data which characterize at least one future state of the motor vehicle, particularly of the powertrain 10. In other words, the targeted transfer of heat from the drive motor 12 to the gearbox 20 is effected, by means of the electronic computing device 22, on the basis of predictive data which characterize at least one future state of the motor vehicle, particularly of the powertrain 10.

The first circuit also contains a heat exchanger designated as a cooling element 24, through which heat exchanger the first medium can flow. Air, particularly ambient air, for example, can flow around the cooling element 24. Particularly when the first medium is formed as a liquid, the cooling element 24 is formed, for example, as a liquid-to-air heat exchanger, because a heat exchange can take place between the air and the first medium via the cooling element 24. In particular, a transfer of heat from the first medium to the air takes place via the cooling element 24, whereby the first medium is cooled. As a result, the drive motor 12 can be cooled effectively.

Moreover, the powertrain 10 also has a heat exchanger 26 characterized as a gearbox heat exchanger, which is arranged, for example, in both the first circuit and in the second circuit. The first medium and the second medium can thereby flow through the heat exchanger 26. In particular, the first medium and the second medium can flow through the heat exchanger 26 during the method and, in doing so, particularly during the second operating state as well as optionally also during the first operating state. An exchange of heat can take place between the media via the heat exchanger 26. For example, because both media are formed as liquids, the heat exchanger 26 is formed, for example, as a liquid-to-liquid heat exchanger. During the method, such an exchange of heat between the media takes place via the heat exchanger 26 such that heat from the first medium passes to the second medium via the heat exchanger 26. The first medium is hereby cooled, and the second medium is heated. As a result, heat can pass from the heated second medium to the gearbox 20, whereby the gearbox 20 is heated. By means of the electronic computing device 22 in this case, the second operating state, in which heat from the drive motor 20 passes to the first media, heat from the first medium passes to the second medium via the heat exchanger 26, and heat passes from the second medium to the gearbox 20, can thus be set in a targeted manner and as desired, particularly by means of corresponding actuation of at least one component of the powertrain 10. The gearbox 20 can hereby be heated in a targeted manner.

Figure 2:
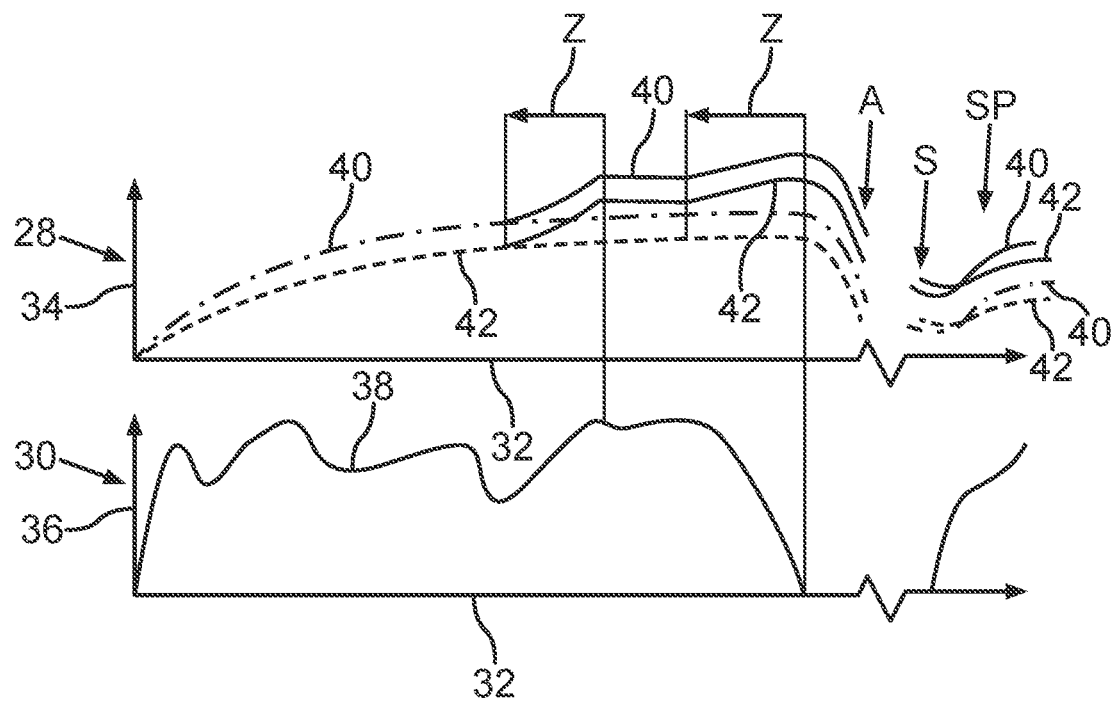
FIG. 2 diagrams to illustrate the method.

FIG. 2 shows diagrams 28 and 30, on the respective x-axes 32 of which time has been plotted. A temperature is plotted on the y-axis 34 of diagram 28, and a driving speed of the motor vehicle is plotted on the y-axis 36 of diagram 30. Thus, curve 38 illustrates the driving speed of the motor vehicle over time. Curve 40 illustrates a temperature of the first medium over time, and curve 42 illustrates a temperature of the gearbox oil over time. Parts of curve 40 shown as a dashed-and-dotted line illustrate, for example, the temperature of the first medium when the method is not implemented. Parts of curve 40 shown as solid lines illustrate the temperature of the first medium when the method is implemented. Accordingly, parts of curve 42 shown as dashed lines illustrate the temperature of the gearbox oil when the method is not implemented, and parts of curve 42 shown as solid lines illustrate the temperature of the gearbox oil when the method is implemented.

FIG. 2 shows future event detections and thus future states of the motor vehicle designated as Z, wherein—as shown in FIG. 2—the respective temperatures are raised in a targeted manner as a function of the future event detections Z. As a result, the gearbox 20 is heated in a targeted manner. The gearbox 20 thereby has an especially high temperature, which is also designated as a restart temperature, for example, at a starting point in time S and a start phase SP subsequent thereto, such that the powertrain 10 as a whole has an advantageous restart temperature at the starting point in time S and during the start phase SP. As a result, the inner friction and thus losses of the powertrain 10 can be kept particularly low. In this case, the starting point in time S and the start phase SP follow, for example, a time interval, which is between the starting point in time S and a stopping point in time A. At the stopping point in time A, the drive motor 12 and the powertrain 10 and thus the motor vehicle are deactivated as a whole, wherein an activation of the motor vehicle is suppressed during the time interval.

As a whole, it can be discerned that an especially high quantity of heat can be stored in the gearbox 20 by means of the method in that the gearbox 20 is heated in a targeted manner. The gearbox 20 is thus utilized as a heat accumulator in order to ensure an advantageously high temperature of the powertrain 10 at the starting point in time S. Due to the targeted heating of the gearbox 20, heat which otherwise is usually lost without being used is provisionally stored in the gearbox 20. In this case, the thermal mass of the gearbox 20 is utilized in that the gearbox 20 is heated via the gearbox oil heat exchanger. Enthalpy of the drive motor 12 is hereby stored in the gearbox. The additional stored enthalpy is stored during the time interval which is also characterized as the parking time in order to ensure a particularly high restart temperature. In particular, the gearbox 20 is heated parallel to the drive motor 12 simply characterized also as the motor. Furthermore, it is conceivable that several gearbox oil heat exchangers are provided, by means of which the gearbox 20 can be heated in a targeted manner. The gearbox oil heated in the described manner can heat the gearbox 20, for example, such that a transfer of heat takes place from the gearbox oil to components of the gearbox 20. The additional enthalpy of the gearbox 20 then stored in the gearbox 20 means that the motor and the gearbox 20 cool down significantly more slowly during the time interval than they otherwise would with conventional powertrains. In other words, the motor and the gearbox have a higher restart temperature than they otherwise would have with conventional powertrains at a fixedly defined restart point in time (starting point in time S). The motor and the gearbox 20 are assemblies which are utilized as thermal accumulators or batteries.

Preferably, the gearbox 20 is heated in a targeted manner not only with consideration of the predictive data but also with knowledge of the gearbox power loss. Preferably, the thermal frictional power behavior of the motor as well as the coolant temperature are also included. This idea could also be applied as relates to an optimization of fan run-on times of the motor. By knowing or estimating the power loss or the efficiency level of the gearbox 20, the temperature change of the gearbox 20 can be calculated using the gearbox mass and the thermal capacity. The thermal function Q results in:

$$Q = M \times cp \times \delta T$$

In this case, M designates the mass of the gearbox, cp designates the thermal capacity of the gearbox 20 and/or the components thereof, and $\delta T$ designates the temperature change. The thermal function Q further results in:

$$Q = P \times t$$

In this case, P designates the power loss and t designates the time. This results in:

$$M \times cp \times \delta T = P \times t / P = \text{frictional torque} \times \text{rotational speed} = 2 \times \pi / 60$$

The power loss or the frictional torque plotted over temperature is a known variable which can be placed and thus stored as a characteristic diagram in an algorithm, in the electronic computing device 22 designated as a control unit, particularly the storage device thereof. There are also frictional loss characteristic diagrams of drive units and the dependency thereof on temperature.

If this knowledge is linked to the use of predictive data, particularly route data, the predictive data enable the preliminary calculation of which average rotational speed and/or driving speed is set and thus also which power loss will prevail and which temperature change ($\delta T$) will result therefrom. Because the power losses in the gearbox 20 depend greatly on temperature, inter alia, due to the viscosity of the gearbox oil, the efficiency of the motor vehicle can be increased and also controlled and/or regulated in a targeted manner due to the knowledge of the predictive data.

Due to knowledge of the driving route, likely speed (city, country, highway), and the expected switch-off point of the motor vehicle (parking times) such as the duration of the expected stopped phase (parking time), for example, by means of constantly reoccurring events such as, for example, the daily drive to work with corresponding trip interruption, an algorithm can be weighted, in a targeted manner, as to when and which energy content of thermal energy is removed from the first circuit of the motor and transferred to the gearbox 20 in order to optimally operate the motor vehicle with respect to its overall efficiency. This thermal energy transfer can take place via the gearbox oil heat exchanger, which is already being used, for example. Thus, it can be calculated as a function of the driving time and/or the average driving speed and as a function of a predicted parking time whether or when it is expedient to transfer thermal energy from the motor to the gearbox 20.

Moreover, a need-based lowering of the gearbox temperature can occur with corresponding pending high-load cases. In corresponding load cases such as, for example, highway driving, a strong acceleration, a mountain drive with trailer, additional heat can be supplied to the gearbox 20 in the form of power loss due to the existing inner load-dependent losses. This leads to a temperature increase in the gearbox 20. In order to fulfill the temperature profile of the gearbox oil, the temperature must remain under a certain temperature limit which is also designated as a limit or limit value. This limit, for example, is 100° C. with respect to the temperature of the gearbox oil. If the gearbox temperature comes close to this limit, for example, attempts are made to cool down the gearbox 20 via the gearbox oil cooler by means of the first medium. The cooling need is reduced accordingly via the gearbox oil cooler once the temperature drops below the limit characterized as the temperature threshold and corresponding hysteresis. This can take place by increasing the temperature of the first medium and/or by changing the coolant volumetric flow on the gearbox oil cooler (switching valve).

By calculating the stopped time (parking time and/or probability of the parking time from learned utilization behavior), it is likewise expedient to increase the gearbox temperature in a targeted manner significantly before parking the motor vehicle in order to thereby use the stored enthalpy. Thus, an increased restart temperature of the gearbox 20 and the flange-mounted motor is achieved over the stopped time. This, in turn, leads to lower frictional power of the gearbox 20 and motor.

For example, gearbox oil heating is released starting at a certain coolant temperature of the motor. The gearbox oil is then heated until an especially advantageous temperature of the second medium and/or in the gearbox, also designated as the preferred temperature, is set, or there is cooling of the gearbox 20 based on a prevailing temperature level. In contrast, it is advantageous, however, to react predictably by means of the predictive data and to calculate an energetic thermal optimum by means of the predictive data as a strategy, according to which, for example, the powertrain 10 is operated.

The invention claimed is:
1. A method for operating a powertrain of a motor vehicle, the powertrain comprising: at least one drive motor and at least one gearbox, such that the motor vehicle is driven by the at least one drive motor via the at least one gearbox, the method comprising:

transferring heat from the at least one drive motor to the at least one gearbox to heat the at least one gearbox in a targeted manner, wherein heat is transferred from the at least one drive motor to the at least one gearbox based on predictive data describing at least one future state of the motor vehicle, and wherein the predictive data comprises information describing an upcoming, temporary switch-off phase of the drive motor.

2. The method according to claim 1, wherein the heat is transferred from the at least one drive motor to the at least one gearbox based further on at least one efficiency value, which is stored in a storage device of an electronic computing device of the powertrain, and wherein the efficiency value describes a level of efficiency and/or a power loss of the at least one gearbox.

3. The method according to claim 1, wherein the heat is transferred from the at least one drive motor to the at least one gearbox based further on at least one limit value, which is stored in a storage device of an electronic computing device of the powertrain, and wherein the limit value describes a maximum permissible temperature of the gearbox.

4. The method according to claim 1, wherein the predictive data comprises information describing at least one of:
   at least one future driving speed of the motor vehicle;
   at least one future load of the at least one drive motor;
   at least one future rotational speed of the at least one drive motor;
   at least one future temperature of the at least one drive motor;
   at least one future temperature of the at least one gearbox;
   a course of a driving route ahead of the motor vehicle;
   a future speed limit which applies to the motor vehicle;
   a future switch-off point of the at least one drive motor;
   a destination, which the motor vehicle will reach at a future point in time.

5. The method according to claim 1, wherein at least part of the predictive data is determined by data which are stored in a storage device of an electronic computing device of the powertrain.

6. The method according to claim 1, wherein the transfer of heat from the at least one drive motor to the at least one gearbox comprises:

transferring heat from the at least one drive motor to at least one medium for cooling the at least one drive motor, transferring heat from the first medium, via at least one heat exchanger, to at least one second medium, and transferring heat from the at least one second medium to the at least one gearbox.

7. The method according to claim 6, wherein the transfer of heat from the at least one drive motor to the at least one gearbox further comprises raising a temperature of the first medium.

8. The method according to claim 7, wherein the at least one drive motor is specifically operated to raise the temperature of the first medium.

9. The method according to claim 6, wherein the transfer of heat from the at least one drive motor to the at least one gearbox further comprises setting a flow rate of at least one of the first medium and the at least one second medium.

10. The method according to claim 1, wherein at least part of the predictive data is received by the motor vehicle wirelessly, from at least one electronic computing device which is external to the motor vehicle.

11. A motor vehicle comprising an electronic computing device and a powertrain with at least one drive motor and at least one gearbox, such that the motor vehicle is driven by the at least one drive motor via the at least one gearbox, wherein the electronic computing device is configured to control a transfer of heat from the at least one drive motor to the at least one gearbox in a targeted manner based on predictive data describing at least one future state of the motor vehicle, and wherein the predictive data comprises information describing an upcoming, temporary switch-off phase of the drive motor.

12. A method for operating a powertrain of a motor vehicle, the powertrain comprising: at least one drive motor and at least one gearbox, such that the motor vehicle is driven by the at least one drive motor via the at least one gearbox, the method comprising:

transferring heat from the at least one drive motor to the at least one gearbox to heat the at least one gearbox in a targeted manner, wherein heat is transferred from the at least one drive motor to the at least one gearbox based on predictive data describing at least one future state of the motor vehicle, and wherein the predictive data comprises information describing a driving route of the motor vehicle.

13. The method according to claim 12, wherein the predictive data further comprises information describing a future switch-off point of the at least one drive motor.

14. The method according to claim 12, wherein the predictive data further comprises information describing a future switch-off point of the motor vehicle.

15. The method according to claim 12, wherein the predictive data further comprises information describing a parking duration of the motor vehicle.

\* \* \* \* \*